(12) United States Patent
Liang et al.

(10) Patent No.: US 10,874,562 B2
(45) Date of Patent: Dec. 29, 2020

(54) MOBILE DEVICE AND TRANSMISSION ASSEMBLY

(71) Applicant: Wistron Corporation, New Taipei (TW)

(72) Inventors: Chen-Yi Liang, New Taipei (TW); Ming-Ju Hsieh, New Taipei (TW)

(73) Assignee: Wistron Corporation, New Taipei (TW)

( * ) Notice: Subject to any disclaimer, the term of this patent is extended or adjusted under 35 U.S.C. 154(b) by 458 days.

(21) Appl. No.: 15/990,817

(22) Filed: May 28, 2018

(65) Prior Publication Data

US 2019/0290513 A1 Sep. 26, 2019

(30) Foreign Application Priority Data

Mar. 23, 2018 (TW) .............................. 107109940 A

(51) Int. Cl.
*A61G 5/04* (2013.01)
*A61H 3/04* (2006.01)
*F16H 37/08* (2006.01)
*A61G 5/10* (2006.01)

(52) U.S. Cl.
CPC ........... *A61G 5/046* (2013.01); *A61G 5/1035* (2013.01); *A61H 3/04* (2013.01); *F16H 37/0813* (2013.01); *A61H 2003/043* (2013.01); *A61H 2003/046* (2013.01)

(58) Field of Classification Search
CPC .... A61G 5/046; A61G 5/1035; A61G 5/1059; A61H 3/04; A61H 2003/043; A61H 2003/046; F16H 37/0813; F16H 37/08; F16H 48/30; F16H 48/34; B60K 2023/046; B60K 2023/043
See application file for complete search history.

(56) References Cited

U.S. PATENT DOCUMENTS 9,828,044 B2 * 11/2017 Heil ..................... B62D 35/005
2006/0276292 A1 * 12/2006 Puiu ................... B60K 23/0808
475/205

FOREIGN PATENT DOCUMENTS

| TW | I302132 | 10/2008 | |
| TW | M404141 | 5/2011 | |
| TW | M420450 | 1/2012 | |
| WO | WO-2009069144 A2 * | 6/2009 | ............. B62D 55/08 |

OTHER PUBLICATIONS

"Office Action of Taiwan Counterpart Application", dated Dec. 22, 2018, p. 1-p. 13.

* cited by examiner

*Primary Examiner* — Kevin Hurley
*Assistant Examiner* — Harold Eric Pahlck, III
(74) *Attorney, Agent, or Firm* — JCIPRNET

(57) ABSTRACT

A mobile device includes a body, a motor, a transmission assembly and two driven components. The motor and the transmission assembly are disposed at the body. The transmission assembly includes a differential, two shafts and two stoppers. The differential is coupled to the motor. The two shafts are respectively coupled to the two opposite sides of the differential. The two stoppers are respectively disposed corresponding to the two shafts. The two driven components are respectively connected to the two shafts. When one of the two shafts is locked by the corresponding stopper, the motor may still drive the other shaft and the driven component connected thereto to rotate relative to the body through the differential. A transmission assembly is also provided.

19 Claims, 3 Drawing Sheets

MOBILE DEVICE AND TRANSMISSION ASSEMBLY

CROSS-REFERENCE TO RELATED APPLICATION

This application claims the priority benefit of Taiwan application serial no. 107109940, filed on Mar. 23, 2018. The entirety of the above-mentioned patent application is hereby incorporated by reference herein and made a part of this specification.

BACKGROUND OF THE INVENTION

Field of the Invention

The invention relates to a transmission assembly and a mobile device, and particularly relates to a transmission assembly and a mobile device using the transmission assembly.

Description of Related Art

In response to market demands for rehabilitation and medical care, to assist the actions of people who have inconvenience in mobility or are under post-operative (post-illness) rehabilitation, currently corresponding mobile devices have been proposed, such as wheelchairs or mobility aids. A common wheelchair is mainly provided for a user to sit on, and driven to move forward through electrical or manual modes. A common mobility aid is mainly provided for a user to grip onto a handle thereof with both hands, so that the user may obtain support during walking and push the mobility aid to move forward, thereby reducing the burden when walking.

Currently, a mobile device that integrates a sitting function of the wheelchair and a mobility aid function of the mobility aid has been proposed, and users may carry out the switch depending on individual needs. In general, the mobile device may include a body, a handle, and a frame, wherein the handle and the frame are pivoted to the body, and can be rotated relative to the body by an external force. In order to replace past operational modes of manually rotating the handle and the support frame to improve the operational convenience of users, the mobile device may be provided with a plurality of motors, whereby the handle may be driven by one of the motors to rotate relative to the body, and the support frame may be driven by another motor to rotate relative to the body. Further, the motors must be additionally disposed with an increase in number of the handles, the support frames, or other similar components, such that apart from having disadvantages of energy consumption and occupying excessive configuration space, the production costs may also be significantly increased.

SUMMARY OF THE INVENTION

The invention provides a mobile device and a transmission assembly which not only saves energy and configuration space, but also significantly reduces production costs.

A mobile device of the invention includes a body, a motor, a transmission assembly, a first driven component and a second driven component. The motor and the transmission assembly are disposed at the body. The transmission assembly includes a first differential, a first shaft, a second shaft, a first stopper and a second stopper. The first differential is coupled to the motor. The first shaft and the second shaft are respectively coupled to two opposite sides of the first differential. The first stopper is disposed corresponding to the first shaft. The second stopper is disposed corresponding to the second shaft. The first driven component is connected to the first shaft. The second driven component is connected to the second shaft. In one state, the first shaft is locked by the first stopper so that the first shaft and the first driven component are unable to rotate relative to the body, and the motor drives the second shaft and the second driven component to rotate relative to the body through the first differential. In another state, the second shaft is locked by the second stopper so that the second shaft and the second driven component are unable to rotate relative to the body, and the motor drives the first shaft and the first driven component to rotate relative to the body through the first differential.

In an exemplary embodiment of the invention, the first differential includes a first output shaft and a second output shaft opposite to the first output shaft, the first output shaft is coupled to the first shaft, and the second output shaft is coupled to the second shaft.

In an exemplary embodiment of the invention, the transmission assembly further includes a first gear, a second gear, a third gear and a fourth gear. The first gear is connected to the first output shaft. The second gear is connected to the second output shaft. The third gear is connected to the first shaft and engaged with the first gear. The fourth gear is connected to the second shaft and engaged with the second gear.

In an exemplary embodiment of the invention, the first output shaft and the second output shaft are coaxially disposed, the first shaft and the first output shaft are disposed in parallel, and the second shaft and the second output shaft are disposed in parallel.

In an exemplary embodiment of the invention, the first shaft and the second shaft are disposed in parallel, and the first shaft and the second shaft are non-coaxially disposed.

In an exemplary embodiment of the invention, the body includes two pivot portions opposite to each other, the first output shaft is pivoted to one of the two pivot portions, and the second output shaft is pivoted to the other one of the two pivot portions.

In an exemplary embodiment of the invention, the first driven component includes a cantilever and a handle, the first shaft is connected to one end of the cantilever, and the handle is connected to another end of the cantilever.

In an exemplary embodiment of the invention, the second driven component includes at least one leg and at least one auxiliary wheel, the second shaft is connected to one end of the leg, and the auxiliary wheel is pivoted to another end of the leg.

In an exemplary embodiment of the invention, the mobile device further includes a frame and at least one auxiliary wheel. One end of the frame is connected to the body. The auxiliary wheel is pivoted to another end of the frame.

In an exemplary embodiment of the invention, the body includes two pivot portions opposite to each other, and two opposite ends of the first shaft are respectively pivoted to the two pivot portions.

In an exemplary embodiment of the invention, the first stopper is fixed to one of the two pivot portions, and the first shaft passes through the first stopper.

In an exemplary embodiment of the invention, the body includes two pivot portions opposite to each other, and two opposite ends of a second shaft are respectively pivoted to the two pivot portions.

In an exemplary embodiment of the invention, the second stopper is fixed to one of the two pivot portions, and the second shaft passes through the second stopper.

In an exemplary embodiment of the invention, the aforementioned number of the transmission assembly, the number of the first driven components and the number of the second driven components are respectively at least two, two of the first driven components are respectively connected to two first shafts of the two transmission assemblies, and the two second driven components are respectively connected to two second shafts of the two transmission assemblies. The mobile device further includes a second differential, and a motor is coupled to two first differentials of the two transmission assemblies through the second differential.

A transmission assembly of the invention is adapted to couple with a motor, the transmission assembly includes a first differential, a first shaft, a second shaft, a first stopper and a second stopper. The first differential is coupled to the motor. The first shaft and the second shaft are respectively coupled to two opposite sides of the first differential. The first stopper is disposed corresponding to the first shaft. The second stopper is disposed corresponding to the second shaft. In one state, the first shaft is locked by the first stopper so that the first shaft is unable to rotate relative to the body, and the motor drives the second shaft to rotate relative to the body through the first differential. In another state, the second stopper is locked to the second shaft so that the second shaft is unable to rotate relative to the body, and the motor drives the first shaft to rotate relative to the body through the first differential.

Based on the foregoing, the mobile device of the invention can synchronously drive the two shafts in the transmission assembly to rotate relative to the body through the cooperation of a single motor and the differential in the transmission assembly, so that each driven component rotates relative to the body with the corresponding shaft in the transmission assembly, saving not only energy and configuration space, but also reducing production costs significantly. On the other hand, when one of the shafts in the transmission assembly is locked by the corresponding stopper, the motor may still drive the other shaft and the driven component connected thereto to rotate relative to the body through the differential in the transmission assembly. Therefore, the operation flexibility is high.

To make the above features and advantages of the invention more comprehensible, embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the invention and, together with the description, serve to explain the principles of the invention.

DESCRIPTION OF DISCLOSED EMBODIMENTS

Figure 1:
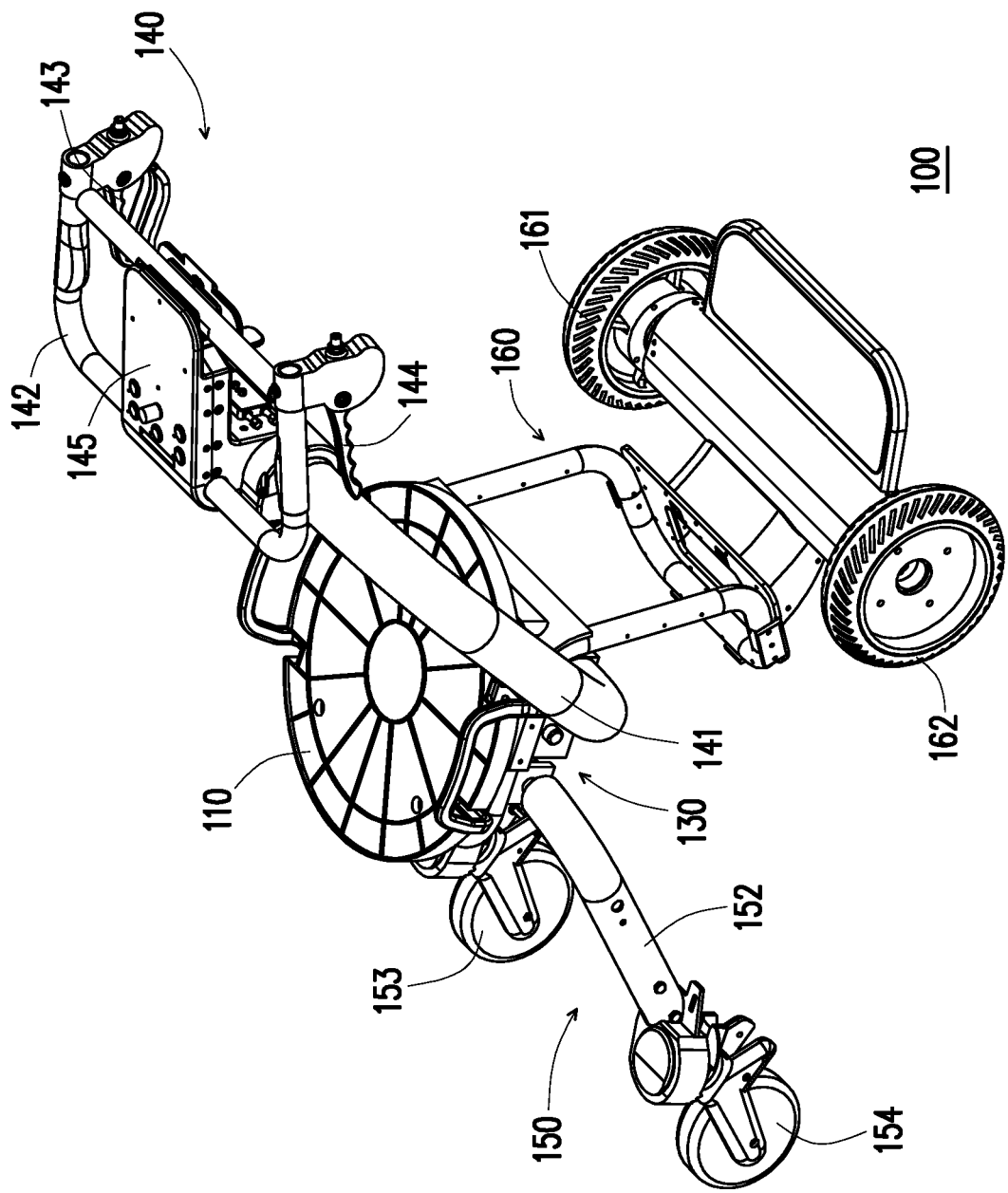
FIG. 1 is a schematic view of a mobile device of an exemplary embodiment of the invention.
Figure 2:
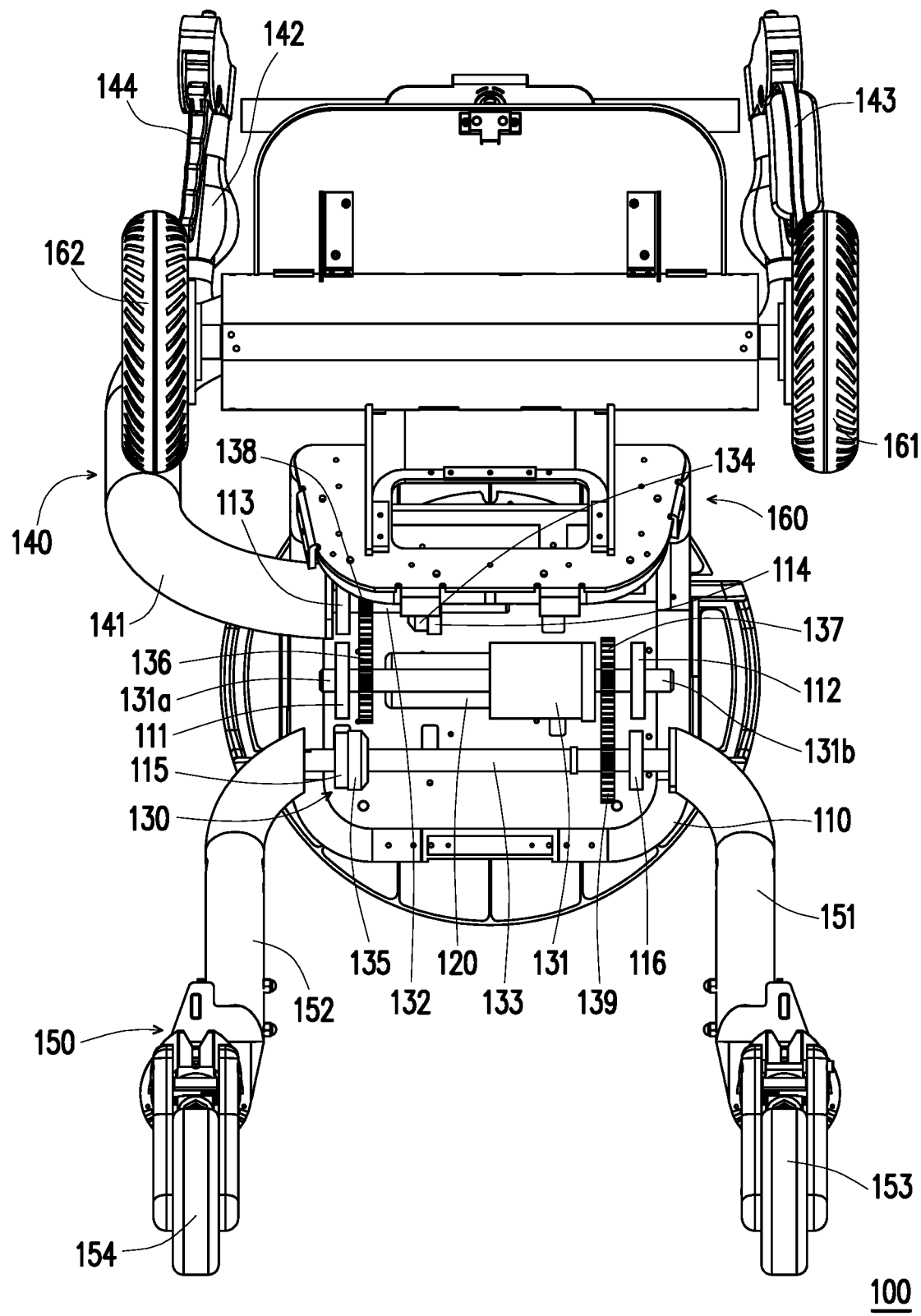
FIG. 2 is a bottom schematic view of the mobile device of FIG. 1.

FIG. 1 is a schematic view of a mobile device of an exemplary embodiment of the invention. FIG. 2 is a bottom schematic view of the mobile device of FIG. 1. Referring to FIG. 1 and FIG. 2, in an exemplary embodiment, a mobile device 100 may be a mobility aid or a wheelchair, but is not limited to the foregoing. The mobile device 100 includes a body 110, a motor 120, a transmission assembly 130, a first driven component 140 and a second driven component 150, wherein the motor 120 and the transmission assembly 130 are disposed on the same side (for example, bottom surface) of the body 110, and the first driven component 140 and the second driven component 150 are coupled to the motor 120 through the transmission assembly 130. Therefore, the motor 120 may drive the first driven component 140 and the second driven component 150 to rotate relative to the body 110 through the transmission assembly 130.

The transmission assembly 130 includes a first differential 131, a first shaft 132, a second shaft 133, a first stopper 134 and a second stopper 135, wherein an output shaft (not shown) of the motor 120 is coupled to a main gear (not shown) of the first differential 131 though a gear (not shown). When the main gear (not shown) is driven to rotate by the motor 120, a planetary gear (not shown) of the first differential 131 drives a left gear (not shown) and a right gear (not shown) to rotate synchronously. On the other hand, the first shaft 132 and the second shaft 133 are respectively coupled to two opposite sides of the first differential 131. In an exemplary embodiment, the first differential 131 includes a first output shaft 131a and a second output shaft 131b opposite to the first output shaft 131a, wherein the first output shaft 131a, for example, is configured to rotate with the right gear (not shown) of the first differential 131, and coupled to the first shaft 132. The second output shaft 131b, for example, is configured to rotate with the left gear (not shown) of the first differential 131, and coupled to the second shaft 133.

The first output shaft 131a and the second output shaft 131b are coaxially disposed, wherein the first shaft 132 and the first output shaft 131a are disposed in parallel, and the second shaft 133 and the second output shaft 131b are disposed in parallel. Further, the first shaft 132 and the second shaft 133 are respectively located on two opposite sides of the first differential 131, wherein the first shaft 132 and the second shaft 133 are disposed in parallel, and are non-coaxially disposed. On the other hand, the first driven component 140 is connected to the first shaft 132, and the second driven component 150 is connected to the second shaft 133. During operation, the motor 120 may synchronously drive the first shaft 132 and the second shaft 133 to rotate relative to the body 110 through the first differential 131, wherein the first driven component 140 rotates relative to the body 110 with the first shaft 132, and the second driven component 150 rotates relative to the body 110 with the second shaft 133. In other words, the mobile device 100 can synchronously drive the first shaft 132 and the second shaft 133 to rotate relative to the body 110 by cooperation of a single motor 120 and the first differential 131, and cause the first driven component 140 and the second driven component 150 to respectively rotate relative to the body 110 with the first shaft 132 and the second shaft 133, saving not only energy and configuration space, but also reducing production costs significantly.

In an exemplary embodiment, the first stopper 134 and the second stopper 135 may be a solenoid valve, an electromagnetic brake device or other applicable brake device, wherein the first stopper 134 is disposed corresponding to the first shaft 132, and the second stopper 135 is disposed corresponding to the second shaft 133. When the first stopper 134 is actuated, the first shaft 132 is locked and temporarily unable to rotate. At this time, the first output shaft 131a and the right gear (not shown) of the first differential 131 are also temporarily unable to rotate, but the motor 120 may still drive the main gear (not shown) of the first differential 131 to rotate, and the main gear (not shown) may drive the left gear (not shown) to rotate through the planetary gear (not shown) of the first differential 131. Therefore, the second output shaft 131b may still rotate with the left gear (not shown) of the first differential 131, and drive the second shaft 133 and the second driven component 150 to rotate relative to the body 110. On the contrary, when the second stopper 135 is actuated, the second shaft 133 is locked and temporarily unable to rotate. At this time, the second output shaft 131b and the left gear (not shown) of the first differential 131 are also temporarily unable to rotate, but the motor 120 may still drive the main gear (not shown) of the first differential 131 to rotate, and the main gear (not shown) may drive the right gear (not shown) to rotate through the planetary gear (not shown) of the first differential 131. Therefore, the first output shaft 131a may still rotate with the right gear (not shown) of the first differential 131, and drive the first shaft 132 and the first driven component 140 to rotate relative to the body 110.

In other words, when the first shaft 132 is locked by the first stopper 134 or the second shaft 133 is locked by the second stopper 135, the motor 120 may still drive an unlocked shaft and a driven component connected thereto to rotate relative to the body 110 through the first differential 131. Therefore, the operating flexibility is high.

Continuing to refer to FIG. 1 and FIG. 2, in an exemplary embodiment, the transmission assembly 130 further includes a first gear 136, a second gear 137, a third gear 138 and a fourth gear 139, wherein the first gear 136 is connected to (or referred as sleeved on) the first output shaft 131a, and the second gear 137 is connected to (or referred as sleeved on) the second output shaft 131b. On the other hand, the third gear 138 is connected to (or referred as sleeved on) the first shaft 132, and engaged with the first gear 136. The fourth gear 139 is connected to (or referred as sleeved on) the second shaft 133, and engaged with the second gear 137. Further, the first gear 136, the second gear 137, the third gear 138 and the fourth gear 139 constitute a gear set, and the foregoing gear set is configured to transmit a power output from the motor 120 to the first shaft 132 and the second shaft 133, so that the first shaft 132 and the second shaft 133 may rotate relative to the body 110.

The body 110 includes a plurality of pivot portions, and pairwise disposed on a same side (for example, bottom surface) of the body 110, but the configuration method of the foregoing pivot portions is not limited thereto. In other exemplary embodiment, two pivot portions disposed in pairs may also be respectively disposed on different sides of a body. In an exemplary embodiment, the pivot portion 111 is disposed opposite to the pivot portion 112, and the two pivot portions 111, 112 are respectively configured for pivoting the first output shaft 131a and the second output shaft 131b thereon. The pivot portion 113 is disposed opposite to the pivot portion 114, and the two pivot portions 113, 114 are respectively configured for pivoting two opposite ends of the first shaft 132 thereon. The pivot portion 115 is disposed opposite to the pivot portion 116, and the two pivot portions 115, 116 are respectively configured for pivoting two opposite ends of the second shaft 133 thereon. In an exemplary embodiment, the first stopper 134 is fixed to one of the two pivot portions 113, 114, and the first shaft 132 passes through the first stopper 134. The second stopper 135 is fixed to one of the two pivot portions 115, 116, and the second shaft 133 passes through the second stopper 135. In particular, as long as the effectiveness of locking the first shaft 132 or the second shaft 133 can be ensured, the first stopper 134 may be disposed on a side of the first shaft 132, that is, the first shaft 132 does not need to pass through the first stopper 134, and the second stopper 135 may be disposed on a side of the second shaft 133, that is, the second shaft 133 does not need to pass through the second stopper 135.

In an exemplary embodiment, the first driven component 140 includes a cantilever 141 and a handle 142, wherein the first shaft 132 is connected to one end of the cantilever 141, and the handle 142 is connected to another end of the cantilever 141. The first driven component 140 may rotate relative to the body 110 with the first shaft 132 to adjust an inclination, wherein the handle 142 may be gripped by a user. On the other hand, the mobile device 100 further includes a control assembly 145, for example, a control panel, a touch panel, or an electronic switch, and is disposed on the handle 142. The user may send out electric signals to a controller (not shown) by operating the control assembly 145, and then send out activation signals to the first stopper 134 or the second stopper 135 by the controller (not shown), to actuate the first stopper 134 or the second stopper 135.

The second driven component 150 includes at least one leg (a first leg 151 and a second leg 152 disposed in pairs are schematically shown) and at least one auxiliary wheel (a first auxiliary wheel 153 and a second auxiliary wheel 154 disposed in pairs are schematically shown), one end of the second shaft 133 is connected to one end of the first leg 151, and the first auxiliary wheel 153 is pivoted to another end of the first leg 151, another end of the second shaft 133 is connected to one end of the second leg 152, and the second auxiliary wheel 154 is pivoted to another end of the second leg 152. The first leg 151 and the second leg 152 may rotate relative to the body 110 with the second shaft 133 to adjust an inclination, wherein the first auxiliary wheel 153 and the second auxiliary wheel 154 are configured to contact ground to provide a gliding function, and the first leg 151 and the second leg 152 are configured to support the body 110 so that the body 110 is suspended on the ground.

The mobile device 100 further includes a frame 160 and at least one auxiliary wheel (a third auxiliary wheel 161 and a fourth auxiliary wheel 162 disposed in pairs are schematically shown), one end of the frame 160 is connected to the body 110, and the third auxiliary wheel 161 and the fourth auxiliary wheel 162 are pivoted to another end of the frame 160. The third auxiliary wheel 161 and the fourth auxiliary wheel 162 are configured to contact ground to provide a gliding function, and the frame 160 is configured to support the body 110 together with the first leg 151 and the second leg 152 so that the body 110 is suspended on the ground. For example, the third auxiliary wheel 161 and the fourth auxiliary wheel 162 may serve as driving wheels, and the first auxiliary wheel 153 and the second auxiliary wheel 154 may serve as driven wheels, but the invention is not limited thereto. On the other hand, the handle 142 may be provided with two stopper control sections 143, 144, configured to allow a user to actuate a brake device corresponding to the foregoing auxiliary wheels.

Figure 3:
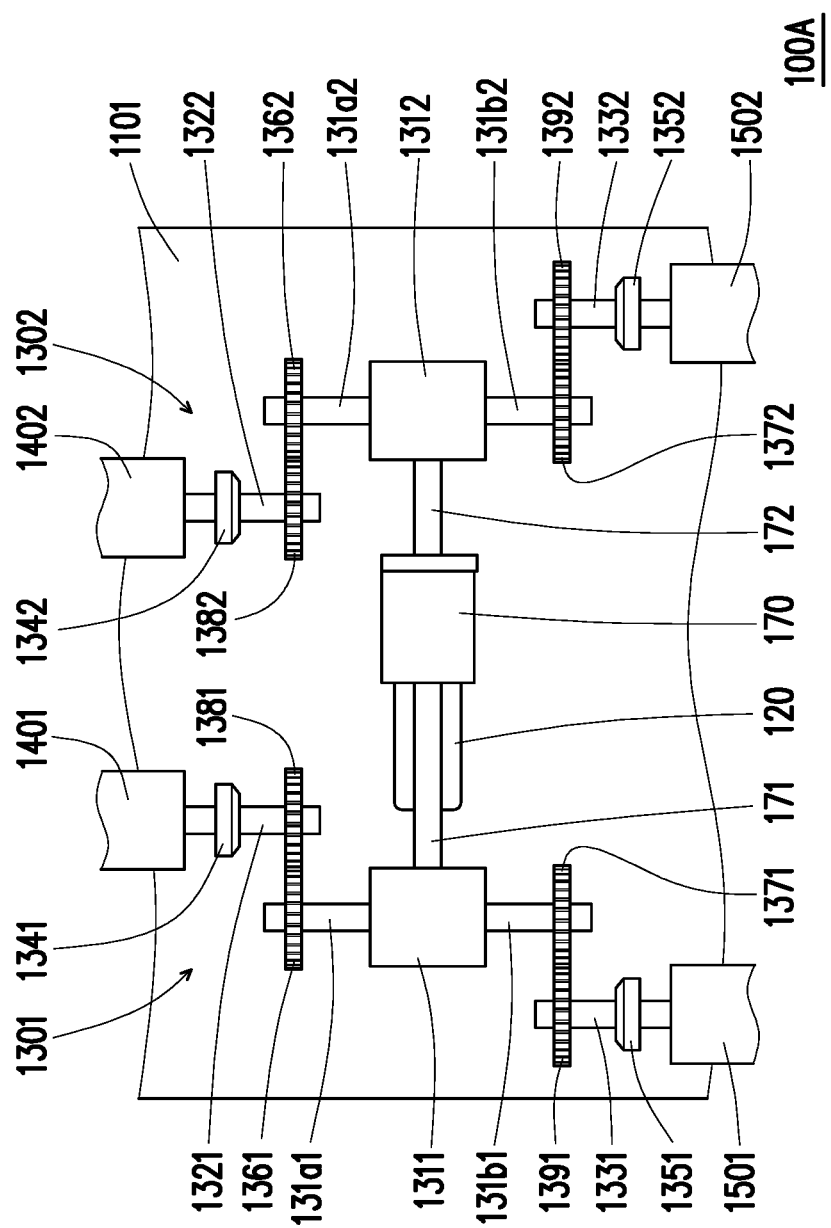
FIG. 3 is a partial bottom schematic view of a mobile device of another exemplary embodiment of the invention.

FIG. 3 is a partial bottom schematic view of a mobile device of another exemplary embodiment of the invention. Referring to FIG. 3, a mobile device 100A of an exemplary embodiment is substantially similar to the mobile device 100 of the previous embodiment, whereby the main difference lies in: a motor 120 in the mobile device 100A is coupled to a first transmission assembly 1301 and a second transmission assembly 1302 through a second differential 170.

Further, two opposite output shafts 171 and 172 of the second differential 170 are respectively coupled to the first transmission assembly 1301 and the second transmission assembly 1302, and a composition of the first transmission assembly 1301 and a composition of the second transmission assembly 1302 are respectively the same or similar to a composition of the transmission assembly 130 of the previous embodiment.

In an exemplary embodiment, an output shaft 171 of the second differential 170 is coupled to a first differential 1311 in a first transmission assembly 1301, wherein a first output shaft 131a1 of the first differential 1311 and a second output shaft 131b1 are respectively coupled to a first shaft 1321 and a second shaft 1331, and the first shaft 1321 and the second shaft 1331 are respectively connected to a first driven component 1401 and a second driven component 1501. Further, the first output shaft 131a1 is engaged with a third gear 1381 sleeved on the first shaft 1321 through a first gear 1361, and the second output shaft 131b1 is engaged with a fourth gear 1391 sleeved on the second shaft 1331 through a second gear 1371.

On the other hand, the output shaft 172 of the second differential 170 is coupled to a first differential 1312 in the second transmission assembly 1302, wherein a first output shaft 131a2 and a second output shaft 131b2 of the first differential 1312 are respectively coupled to a first shaft 1322 and a second shaft 1332, and the first shaft 1322 and the second shaft 1332 are respectively connected to a first driven component 1402 and a second driven component 1502. Further, the first output shaft 131a2 is engaged with a third gear 1382 sleeved on the first shaft 1322 through a first gear 1362, and the second output shaft 131b2 is engaged with fourth gear 1392 sleeved on the second shaft 1332 through a second gear 1372.

Therefore, during operation, the motor 120 may drive the first driven component 1401 and the second driven component 1501 to synchronously rotate relative to the body 1101 through the second differential 170, and drive the first driven component 1402 and the second driven component 1502 to synchronously rotate relative to the body 1101 through the second differential 170 and the second transmission assembly 1302.

The first shaft 1321 and the second shaft 1331 are correspondingly provided with a first stopper 1341 and a second stopper 1351 respectively, and the first shaft 1322 and the second shaft 1332 are correspondingly provided with a first stopper 1342 and a second stopper 1352 respectively. Whether the actuation of the foregoing four stoppers may respectively affect the degrees of rotational freedom of the foregoing four shafts. Further, based on the cooperation of the second differential 170, the first differential 1311, and the first differential 1312, in one state, when any one of the foregoing four stoppers is actuated, the corresponding shaft thereof is locked and temporarily unable to rotate. The locked shaft is also unable to drive the corresponding driven component to rotate relative to the body 1101, but each of the remaining shafts may still drive the corresponding driven components to rotate relative to the body 1101. In another state, when any two of the foregoing four stoppers are actuated, the corresponding two shafts thereof are respectively locked and temporarily unable to rotate. The two locked shafts are also unable to respectively drive the corresponding two driven components to rotate relative to the body 1101, but each of the remaining shafts may still drive the corresponding driven components to rotate relative to the body 1101. In yet another state, when any three of the foregoing four stoppers are actuated, the corresponding three shafts thereof are respectively locked and temporarily unable to rotate. The three locked shafts are also unable to respectively drive the corresponding three driven components to rotate relative to the body 1101, but the remaining one shaft may still drive the corresponding driven component to rotate relative to the body 1101.

In summary of the foregoing, the mobile device of the invention may synchronously drive the two shafts in the transmission assembly to rotate relative to the body through the cooperation of a single motor and the differential in the transmission assembly, so that each driven component rotates relative to the body with the corresponding shaft in the transmission assembly, saving not only energy and configuration space, but also reducing production costs significantly. On the other hand, when one of the shafts in the transmission assembly is locked by the corresponding stopper, the motor may still drive the other shaft and the driven component connected thereto to rotate relative to the body through the differential in the transmission assembly. Therefore, the operation flexibility is high.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A mobile device comprising:
    a body;
    a motor, disposed at the body;
    a transmission assembly, disposed at the body, the transmission assembly comprising:
        a first differential, coupled to the motor;
        a first shaft, coupled to one side of the first differential;
        a second shaft, coupled to another side of the first differential;
        a first stopper, disposed corresponding to the first shaft; and
        a second stopper, disposed corresponding to the second shaft;
    a first driven component, connected to the first shaft; and
    a second driven component, connected to the second shaft,
    in one state, the first shaft is locked by the first stopper so that the first shaft and the first driven component being unable to rotate relative to the body, and the motor drives the second shaft and the second driven component to rotate relative to the body through the first differential,
    in another state, the second shaft is locked by the second stopper so that the second shaft and the second driven component being unable to rotate relative to the body, and the motor drives the first shaft and the first driven component to rotate relative to the body through the first differential.

2. The mobile device according to claim 1, wherein the first differential comprises a first output shaft and a second output shaft opposite to the first output shaft, the first output shaft is coupled to the first shaft, and the second output shaft is coupled to the second shaft.

3. The mobile device according to claim 2, wherein the transmission assembly further comprising:
    a first gear, connected to the first output shaft;
    a second gear, connected to the second output shaft;
    a third gear, connected to the first shaft, and engaged with the first gear, and a fourth gear, connected to the second shaft, and engaged with the second gear.

4. The mobile device according to claim 2, wherein the first output shaft and the second output shaft are coaxially disposed, the first shaft and the first output shaft are disposed in parallel, and the second shaft and the second output shaft are disposed in parallel.

5. The mobile device according to claim 1, wherein the first shaft and the second shaft are disposed in parallel, and the first shaft and the second shaft are non-coaxially disposed.

6. The mobile device according to claim 2, wherein the body comprises two pivot portions opposite to each other, the first output shaft is pivoted to one of the two pivot portions, and the second output shaft is pivoted to another one of the two pivot portions.

7. The mobile device according to claim 1, wherein the first driven component comprises a cantilever and a handle, the first shaft is connected to one end of the cantilever, and the handle is connected to another end of the cantilever.

8. The mobile device according to claim 1, wherein the second driven component comprises at least one leg and at least one auxiliary wheel, the second shaft is connected to one end of the leg, and the auxiliary wheel is pivoted to another end of the leg.

9. The mobile device according to claim 1, further comprising:
a frame, one end of the frame is connected to the body; and
at least one auxiliary wheel, pivoted to another end of the frame.

10. The mobile device according to claim 1, wherein the body comprises two pivot portions opposite to each other, and two opposite ends of the first shaft are respectively pivoted to the two pivot portions.

11. The mobile device according to claim 10, wherein the first stopper is fixed to one of the two pivot portions, and the first shaft passes through the first stopper.

12. The mobile device according to claim 1, wherein the body comprises two pivot portions opposite to each other, and two opposite ends of the second shaft are respectively pivoted to the two pivot portions.

13. The mobile device according to claim 12, wherein the second stopper is fixed to one of the two pivot portions, and the second shaft passes through the second stopper.

14. The mobile device according to claim 1, wherein a number of the transmission assemblies, a number of the first driven components and a number of the second driven components are respectively at least two, the two first driven components are respectively connected to the two first shafts of the two transmission assemblies, and the two second driven components are respectively connected to the two second shafts of the two transmission assemblies, the mobile device further comprises a second differential, and the motor is coupled to the two first differentials of the two transmission assemblies through the second differential.

15. A transmission assembly adapted to couple to a motor, the transmission assembly comprising:
a first differential, coupled to the motor;
a first shaft, coupled to one side of the first differential;
a second shaft, coupled to another side of the first differential;
a first stopper, disposed corresponding to the first shaft; and
a second stopper, disposed corresponding to the second shaft,
in one state, the first shaft is locked by the first stopper so that the first shaft being unable to rotate, and the motor drives the second shaft to rotate through the first differential,
in another state, the second shaft is locked by the second stopper so that the second shaft being unable to rotate relative to the body, and the motor drives the first shaft to rotate relative to the body through the first differential.

16. The transmission assembly according to claim 15, wherein the first differential comprises a first output shaft and a second output shaft opposite to the first output shaft, the first output shaft is coupled to the first shaft, and the second output shaft is coupled to the second shaft.

17. The transmission assembly according to claim 16, further comprising:
a first gear, connected to the first output shaft;
a second gear, connected to the second output shaft;
a third gear, connected to the first shaft, and engaged with the first gear, and
a fourth gear, connected to the second shaft, and engaged with the second gear.

18. The transmission assembly according to claim 16, wherein the first output shaft and the second output shaft are coaxially disposed, the first shaft and the first output shaft are disposed in parallel, and the second shaft and the second output shaft are disposed in parallel.

19. The transmission assembly according to claim 15, wherein the first shaft and the second shaft are disposed in parallel, and the first shaft and the second shaft are non-coaxially disposed.

* * * * *